United States Patent
Lavigne et al.

(10) Patent No.: US 9,723,661 B2
(45) Date of Patent: Aug. 1, 2017

(54) SYSTEMS AND METHODS FOR POWERING A MICROPROCESSOR FROM AN ISOLATED SECONDARY SIDE TO ENABLE OFF-LINE COMMUNICATION ON AN LED DRIVER

(71) Applicant: GE Lighting Solutions, LLC, East Cleveland, OH (US)

(72) Inventors: Eric Lavigne, Lachine (CA); Mohamed Cherif Ghanem, Lachine (CA); Francois Giguere, Lachine (CA)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/096,317

(22) Filed: Apr. 12, 2016

(65) Prior Publication Data

US 2016/0323943 A1 Nov. 3, 2016

Related U.S. Application Data

(60) Provisional application No. 62/155,680, filed on May 1, 2015.

(51) Int. Cl.
*H05B 41/16* (2006.01)
*H05B 33/08* (2006.01)
(Continued)

(52) U.S. Cl.
CPC ......... *H05B 33/0809* (2013.01); *H01F 30/04* (2013.01); *H02M 5/10* (2013.01)

(58) Field of Classification Search
CPC ........ H05B 41/36; H05B 37/02; H05B 41/16; H05B 41/2827; H05B 41/2828;
(Continued)

(56) References Cited

U.S. PATENT DOCUMENTS 5,856,712 A 1/1999 Suzuki et al.
8,810,159 B2 8/2014 Nuhfer et al.
(Continued)

FOREIGN PATENT DOCUMENTS

WO 2013/025544 A1 2/2013
WO 2013/150443 A1 10/2013

OTHER PUBLICATIONS

International Search Report and Written Opinion issued in connection with corresponding Application No. PCT/US2016/030310 on Jul. 5, 2016.

*Primary Examiner* — Minh D A
(74) *Attorney, Agent, or Firm* — GE Global Patent Operation; Peter T. DiMauro

(57) ABSTRACT

An LED driver circuit includes a primary circuit and a circuit electrically isolated from the primary circuit, a transformer having a primary winding configured to receive power from an alternating current source and to generate power in a first secondary winding configured to provide power to the electrically isolated circuit, and to generate power in a second secondary winding configured to provide power to the primary circuit, and a conductor connected to an end of the first secondary winding and configured to connect a winding driver signal to the first secondary winding to generate power in the second secondary winding.

20 Claims, 8 Drawing Sheets

(51) Int. Cl.
*H01F 30/04* (2006.01)
*H02M 5/10* (2006.01)

(58) Field of Classification Search
CPC  H05B 41/295; H05B 33/0815; H05B 41/042; H05B 41/2822; H05B 41/282; H05B 41/232; H05B 41/3925; H05B 41/2325; H05B 41/28; B23K 11/248; B23K 9/1031; B23K 9/1037; G05B 11/013; H02M 1/042; H02M 1/045; H04Q 1/32; H01F 38/10; H01F 38/085
USPC .......................... 315/276, 278, 274, 279, 273
See application file for complete search history.

(56) References Cited

U.S. PATENT DOCUMENTS

| | | | | |
|---|---|---|---|---|
| 2010/0025720 | A1* | 2/2010 | Naum | H01L 33/64 257/99 |
| 2012/0020038 | A1 | 1/2012 | Nishiyama | |
| 2012/0300508 | A1* | 11/2012 | Fang | H02M 3/33523 363/21.17 |
| 2014/0091718 | A1* | 4/2014 | Brinlee | H05B 33/0815 315/185 R |
| 2014/0361701 | A1* | 12/2014 | Siessegger | H05B 33/0803 315/200 R |
| 2015/0023066 | A1* | 1/2015 | Kawashima | H02M 3/33553 363/21.02 |

\* cited by examiner

SYSTEMS AND METHODS FOR POWERING A MICROPROCESSOR FROM AN ISOLATED SECONDARY SIDE TO ENABLE OFF-LINE COMMUNICATION ON AN LED DRIVER

FIELD

The disclosed exemplary embodiments relate generally to lighting control systems, and more particularly to structures and techniques for applying power to at least a portion of a lighting driver circuit.

BACKGROUND

Incandescent light bulbs create light by conducting electricity through a resistive filament and heating the filament to a very high temperature to produce visible light. Incandescent bulbs are made in a wide range of sizes and voltages. The bulbs typically include an enclosure with a tungsten filament inside and a base connector that provides both an electrical and structural support connection. Incandescent bulbs generally mate with a lamp socket having a threaded Edison base connector, bayonet base connector, pin base connector, or any suitable connector for providing electrical power to the bulb. However, incandescent light bulbs are generally inefficient and require frequent replacement. These lamps are in the process of being replaced by more efficient types of electric light such as fluorescent lamps, high-intensity discharge lamps, and, in particular, lamps with light emitting diode (LED) light sources.

LED technology continues to advance resulting in improved efficiencies and lower costs with LED light sources found in lighting applications ranging from small pin point sources to stadium lights. An LED light source is generally powered by an LED driver circuit that converts alternating current (AC) mains power to a constant current applied to LEDs within the LED light source. The LED driver circuit typically includes support circuitry and a microcontroller that may be programmable for different AC mains input requirements and different output voltages and currents.

The LED driver circuit may also include a primary circuit connected to an AC supply and a control side, isolated from the primary circuit. In some implementations, the control side may be isolated from the primary circuit in accordance with certain industry standards, for example, International Electrotechnical Commission (IEC) Class II, where the secondary side may also be referred to as being double insulated. In many implementations, the microcontroller for controlling the LED driver circuit may be located on the primary circuit in order to more efficiently monitor line input voltage and current, control the power factor presented to the AC supply, and perform other maintenance functions. However, as a result, programming the microcontroller, or reading data stored in the microcontroller memory, normally requires application of AC power to the primary circuit of the LED driver circuit in order to supply power to the microprocessor. This in turn may require incorporating additional procedures and additional safety measures, in particular when programming the microcontroller or attempting to read data from the microcontroller memory during production, installation, or service operations. For example, access to the primary side of the LED driver with wiring other than the AC line to provide power can be unsafe since the circuit is class 1 rated. Such access would require additional certification and installations guidelines to insure safety.

It would be advantageous to provide power to a microprocessor of an LED driver circuit without applying AC power to the primary circuit.

SUMMARY

The disclosed embodiments are directed to an LED driver circuit including a primary circuit and a circuit electrically isolated from the primary circuit, a transformer having a primary winding configured to receive power from an alternating current source and to generate power in a first secondary winding configured to provide power to the electrically isolated circuit, and to generate power in a second secondary winding configured to provide power to the primary circuit, and a conductor connected to an end of the first secondary winding and configured to connect a winding driver signal to the first secondary winding to generate power in the second secondary winding.

The winding driver signal may be generated by a frequency generator.

The frequency generator may include a timer configured to produce the winding driver signal at a predetermined frequency and duty cycle.

The predetermined frequency and duty cycle may be determined by characteristics of one or more of the transformer, first and second secondary windings, an electrical load presented by the primary circuit, and an electrical load presented by the electrically isolated circuit.

The frequency generator may include one or more power drivers for providing the winding driver signal at a specified voltage and current.

The specified voltage and current may be determined by characteristics of one or more of the transformer, first and second secondary windings, an electrical load presented by the primary circuit, and an electrical load presented by the electrically isolated circuit.

The frequency generator may be part of the LED driver circuit.

The frequency generator may be part of a test apparatus configured to be coupled to the LED driver circuit.

The LED driver circuit may include a communication port configured for exchanging data with a microcontroller of the primary circuit.

The data may be read from a memory that may be internal or external to the microcontroller.

The data may be stored in a memory that may be internal or external to the microcontroller.

The data may include commands to be executed by the microcontroller.

The disclosed embodiments are further directed to a method of providing power to an LED driver circuit including applying a winding driver signal to a first secondary winding of a transformer to generate power in a second secondary winding of the transformer, the transformer having a primary winding configured to receive power from an alternating current source and to generate power in the first and secondary windings, using power generated in the second secondary winding to provide power to a primary circuit of the LED driver circuit, and using power generated in the first secondary winding by applying the winding driver signal to the first secondary winding to power a circuit electrically isolated from the primary circuit.

The method may include using a frequency generator to generate the winding driver signal.

The frequency generator may include one or more of a timer configured to produce the winding driver signal at a predetermined frequency and duty cycle, and one or more power drivers for providing the winding driver signal at a specified voltage and current.

The method may include determining the predetermined frequency and duty cycle from characteristics of one or more of the transformer, first and second secondary windings, an electrical load presented by the primary circuit, and an electrical load presented by the electrically isolated circuit.

The method may include determining the specified voltage and current from characteristics of one or more of the transformer, first and second secondary windings, an electrical load presented by the primary circuit, and an electrical load presented by the electrically isolated circuit.

The method may include exchanging data with a microcontroller of the primary circuit using a communication port of the LED driver circuit.

Exchanging data with the microcontroller may include reading data from a memory that may be internal or external to the microcontroller.

Exchanging data with the microcontroller may include storing data in a memory that may be internal or external to the microcontroller.

DETAILED DESCRIPTION

The embodiments of the present disclosure are directed to providing power to components of an LED driver circuit without supplying AC power to the primary circuit of the LED driver circuit.

Figure 1:
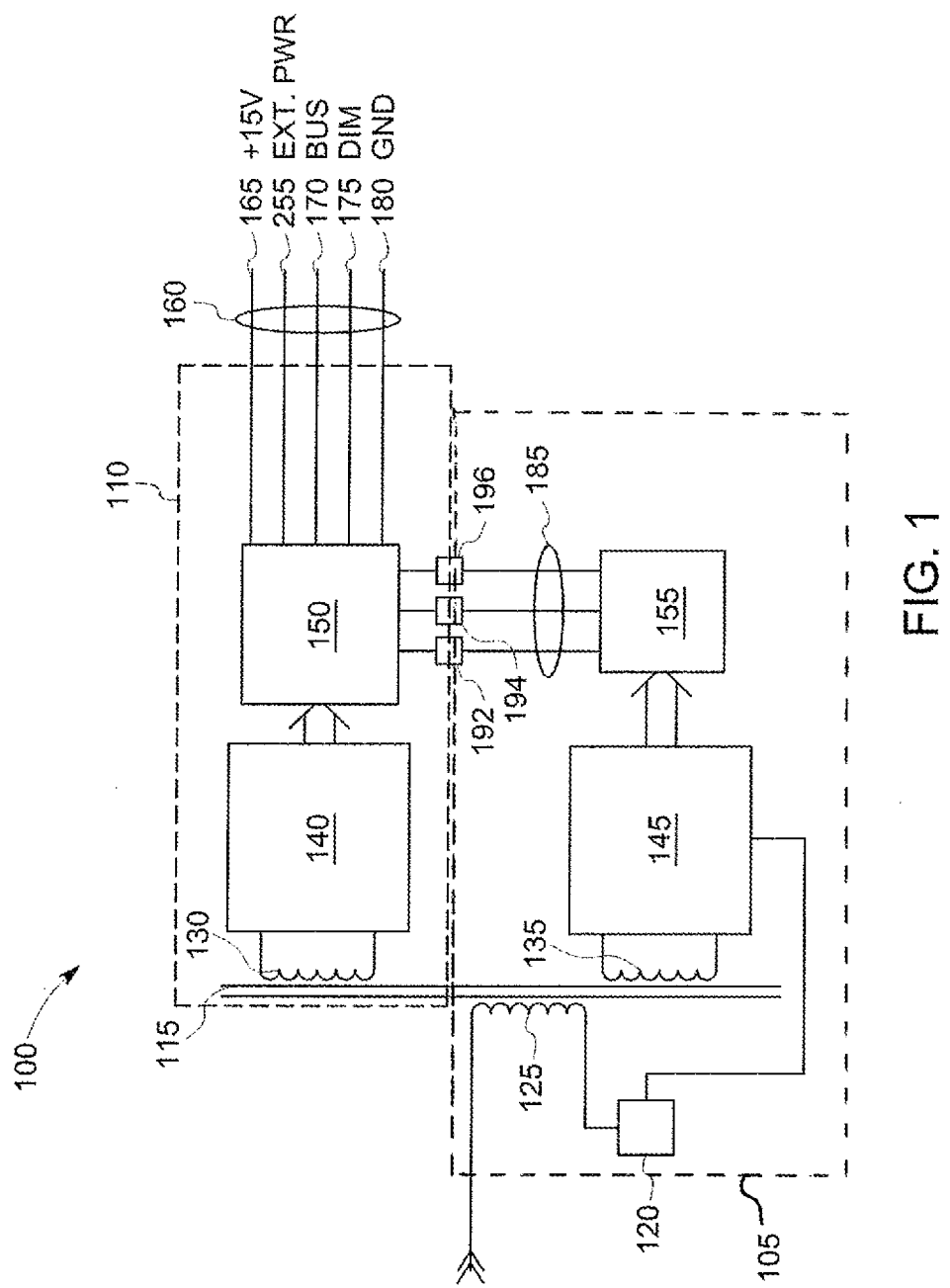
FIG. 1 shows a block diagram of an exemplary auxiliary bias supply of an LED driver circuit according to the disclosed embodiments.

FIG. 1 shows a block diagram of an exemplary auxiliary bias supply 100 of an LED driver circuit having a primary circuit 105 and an isolated circuit 110. The primary circuit 105 may be isolated from the isolated circuit 110 by a transformer 115 and the primary circuit 105 may provide isolated power to the control side using the transformer 115. The primary circuit may include a switching unit 120 that switches power to a primary winding 125 of the transformer 115. Secondary windings 130, 135 of transformer may provide power to control side auxiliary power circuit 140 and primary side auxiliary power circuit 145, respectively. Control side auxiliary power circuit 140 may provide power to control and communication circuit 150. The control and communication circuit 150 may provide a communication port 160 that may include a power signal 165, a communication bus 170, a dimming signal 175 and a ground signal 180. In some implementations the communication bus 170 may be a single wire, bidirectional communication bus.

Primary side auxiliary power circuit 145 provides power to a microcontroller 155 on the primary circuit 105. The microcontroller 155 may be coupled to the control and communication circuit 150 by control and communication signals 185. The control and communication signals 185 may be coupled between the microcontroller 155 and the control and communication circuit 150 using electrical isolators 192, 194, 196 which may be embodied as, for example, one or more amplifiers, optical couplers, transformers, capacitive couplers, or any other suitable isolation devices. As mentioned above, the control side 110 may be isolated from the primary circuit 105 in accordance with any suitable electrical isolation standard, for example, International Electrotechnical Commission (IEC) Class II.

Figure 2:
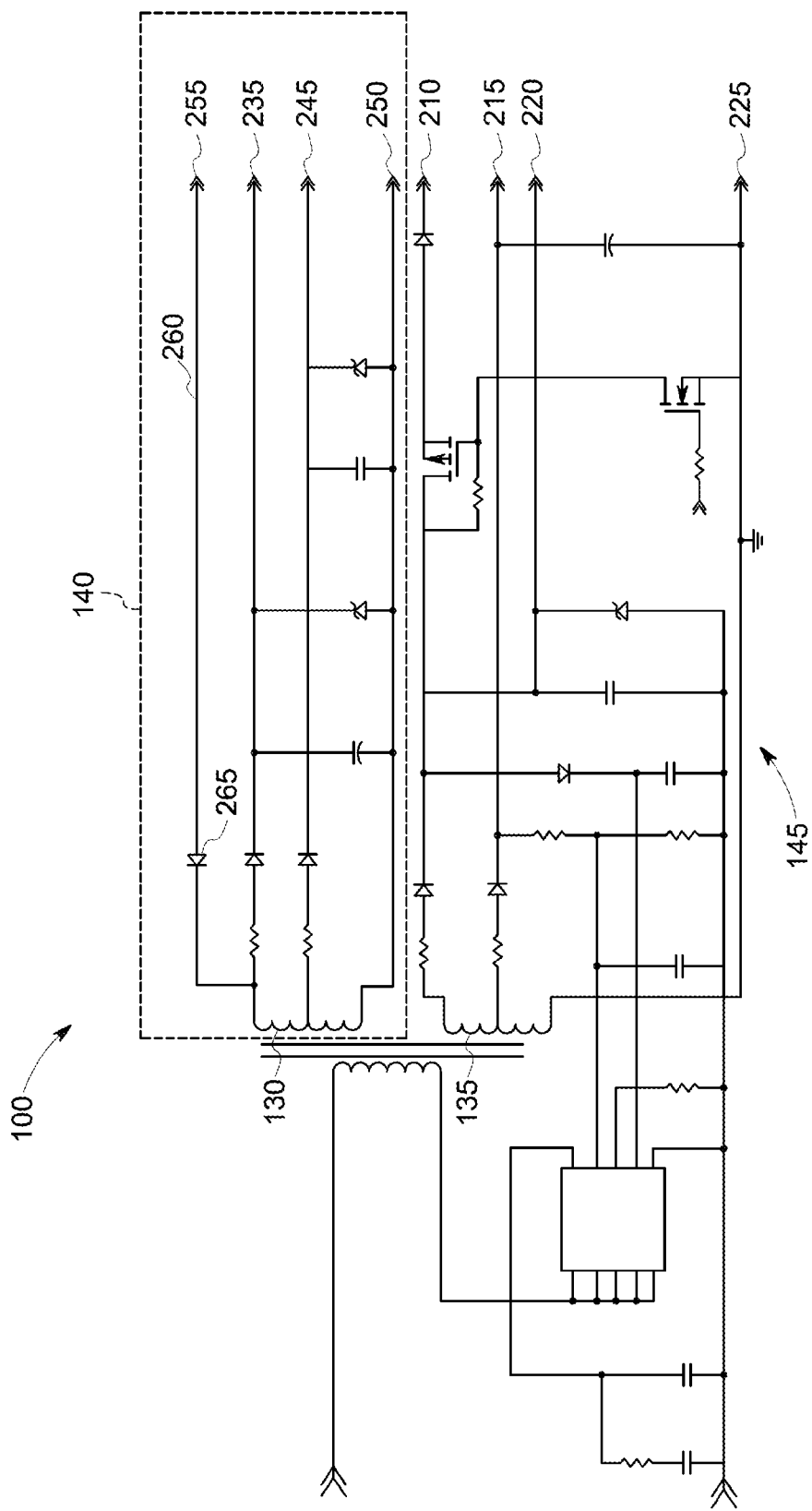
FIG. 2 shows a schematic diagram of at least a portion of the auxiliary bias supply.

FIG. 2 shows a schematic diagram of at least a portion of the auxiliary bias supply 100 in greater detail, in particular, the isolated control power side auxiliary circuit 140 and the primary side auxiliary power circuit 145. The primary side auxiliary power circuit 145 may convert AC power from secondary winding 135 to various direct current (DC) outputs for the microcontroller 155 and associated support circuitry, for example, a 15 volt output 210, a 5 volt output 215, and a regulated 15 volt output 220. The primary side auxiliary power circuit 145 may also provide a ground signal 225.

Figure 3:
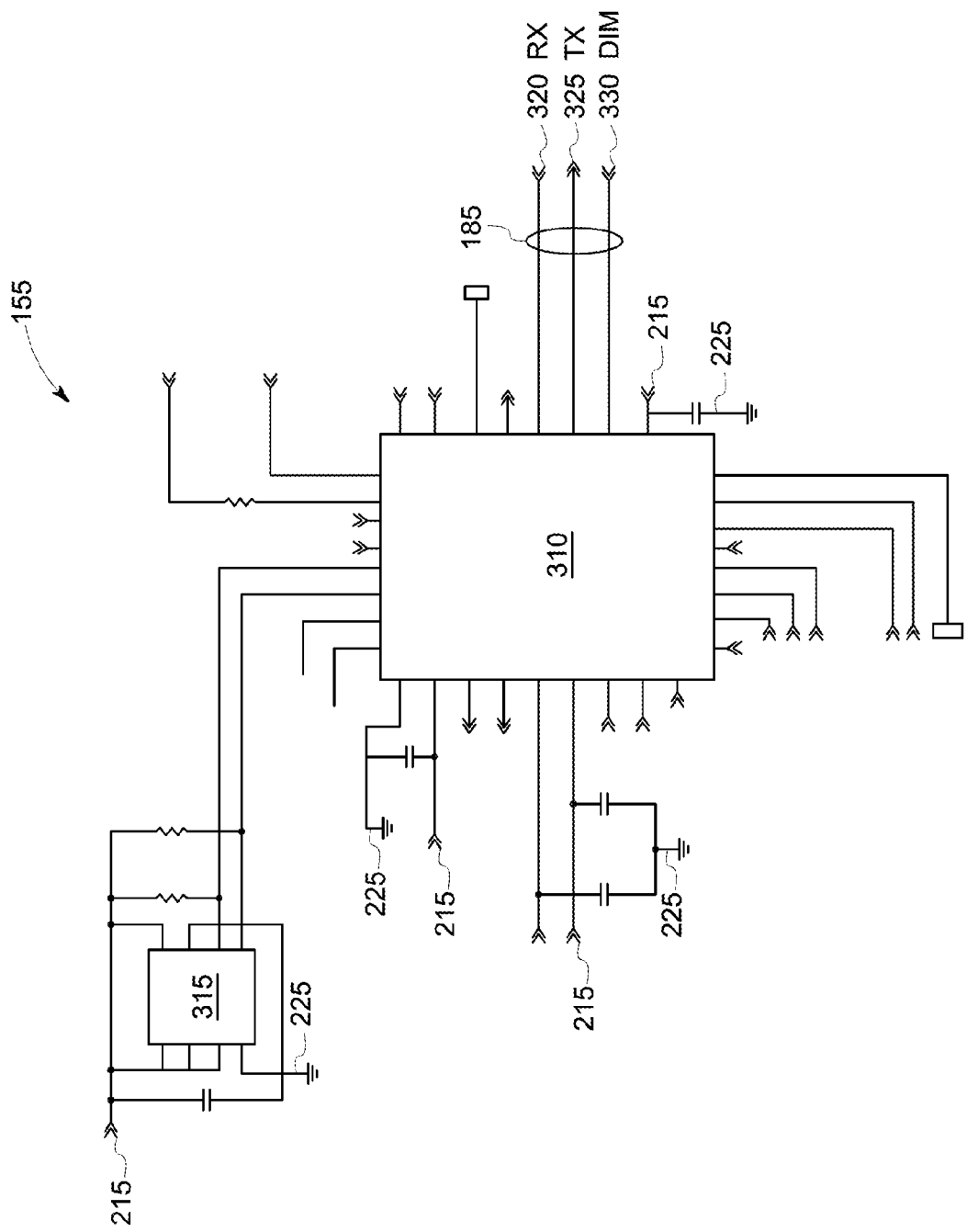
FIG. 3 shows a schematic diagram of an embodiment of a microcontroller according to the disclosed embodiments.

FIG. 3 shows a schematic diagram of an embodiment of the microcontroller 155 of the primary circuit. The microcontroller 155 may include a microprocessor 310 and a memory 315. The microprocessor 310 may execute computer readable code stored in the memory 315 to operate and perform the functions of the auxiliary bias supply 100. The memory may also be used to store characteristics of the auxiliary bias supply 100, for example, a programmed current output, serial number, date of manufacture, hardware and software revision numbers, test jig information, production test results, customer information, installation information, information related to performance in the field, or any other suitable information. In some exemplary embodiments, the memory 315 may be incorporated in the microprocessor 310. In other embodiments, the memory 315 may be internal to the microcontroller 155 but may be separate from the microprocessor. In still other embodiments, the memory may be external to the microcontroller 155. The microprocessor 310 and memory 315 may be supplied with power from the primary side auxiliary power circuit 145, for example from 5 volt output 215. A ground signal may be provided by ground signal 225. As mentioned above, the microcontroller 155 may be coupled to the control and communication circuit 150 by isolated control and communications signals 185, such as, a receive data signal 320, a transmit data signal 325, and a dimming signal 330.

Referring again to FIG. 2, the control side auxiliary power circuit 140 of the isolated circuit 110 may convert AC power from secondary winding 130 to various DC outputs for the control and communication circuit 150 and associated support circuitry, for example, a 15 volt output 235, a 5 volt output 245, and a ground signal 250.

Figure 4:
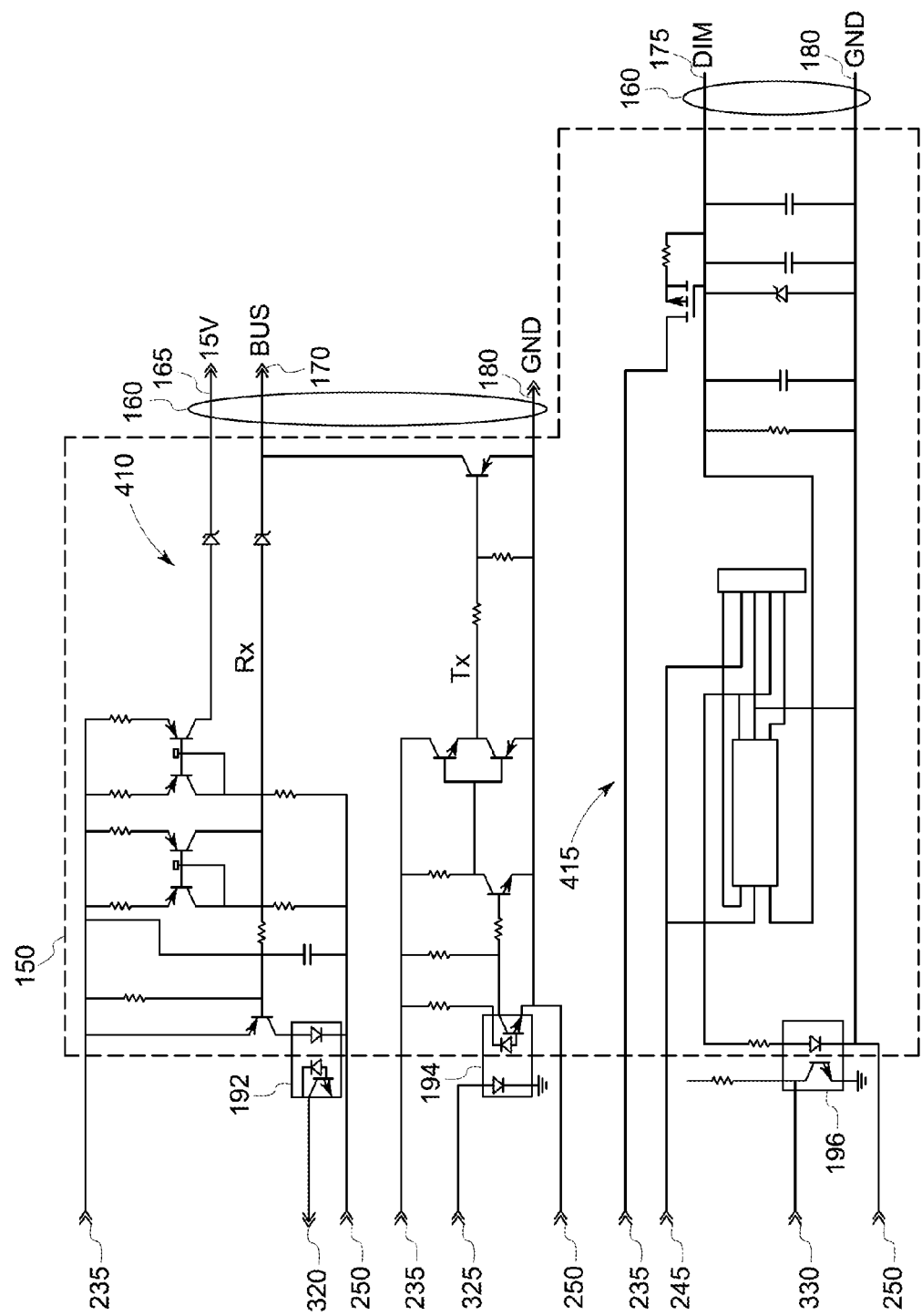
FIG. 4 shows a schematic diagram of an embodiment of control and communication circuitry of the disclosed embodiments.

FIG. 4 shows a schematic diagram of an embodiment of the control and communication circuit 150 of the isolated circuit 110. The control and communication circuit 150 may utilize the 15 volt output 235 and ground signal 250 to power communication circuitry 410 for converting between the receive data signal 320 and transmit data signal 325 of the microcontroller 155, and the communication bus signal 170 of the communication port 160. The control and communication circuit 150 may utilize the 5 volt output 245 and ground signal 250 to control circuitry 415 for converting between an externally provided dimming signal 175 and the dimming signal 330 of the microcontroller 155.

According to the disclosed embodiments, the auxiliary bias supply 100 includes a facility for providing power to components of the LED driver circuit 100 without supplying AC power to the primary circuit 105.

Returning to FIG. 2, in at least one embodiment, the isolated control side auxiliary power circuit 140 includes a conductor 260 connected to an end of winding 130 for connection to a winding driver signal 255. A diode 265 may be provided in series with the conductor 260. By applying an AC or oscillating signal between winding driver signal 255 and ground signal 250, an AC voltage may be developed across winding 130 resulting in an AC voltage across winding 135. The primary side auxiliary power circuit 145 may use the voltage developed across winding 135 in this manner to provide the 15 volt output 210, 5 volt output 215, and the regulated 15 volt output 220. Thus, by driving winding driver signal 255 and winding 130 with an oscillating signal, power may be provided to components of the primary circuit 105 of the auxiliary bias supply 100. Similarly, the control side auxiliary power circuit 140 of the isolated circuit 110 may use the voltage developed across winding 130 to provide the 15 volt output 235 and the 5 volt output 245. The availability of the various power outputs 210, 215, 220, 235, 245 enables offline communication with the auxiliary bias supply 100 without providing an AC supply to the non-isolated primary circuit 105.

From at least one viewpoint, the disclosed embodiments provide structures and methods that use a switch mode power supply "backwards" in order to pass power by adding only a very low cost conductor and diode, and without adding additional rectifying circuitry, and without utilizing other power delivery techniques.

Figure 5:
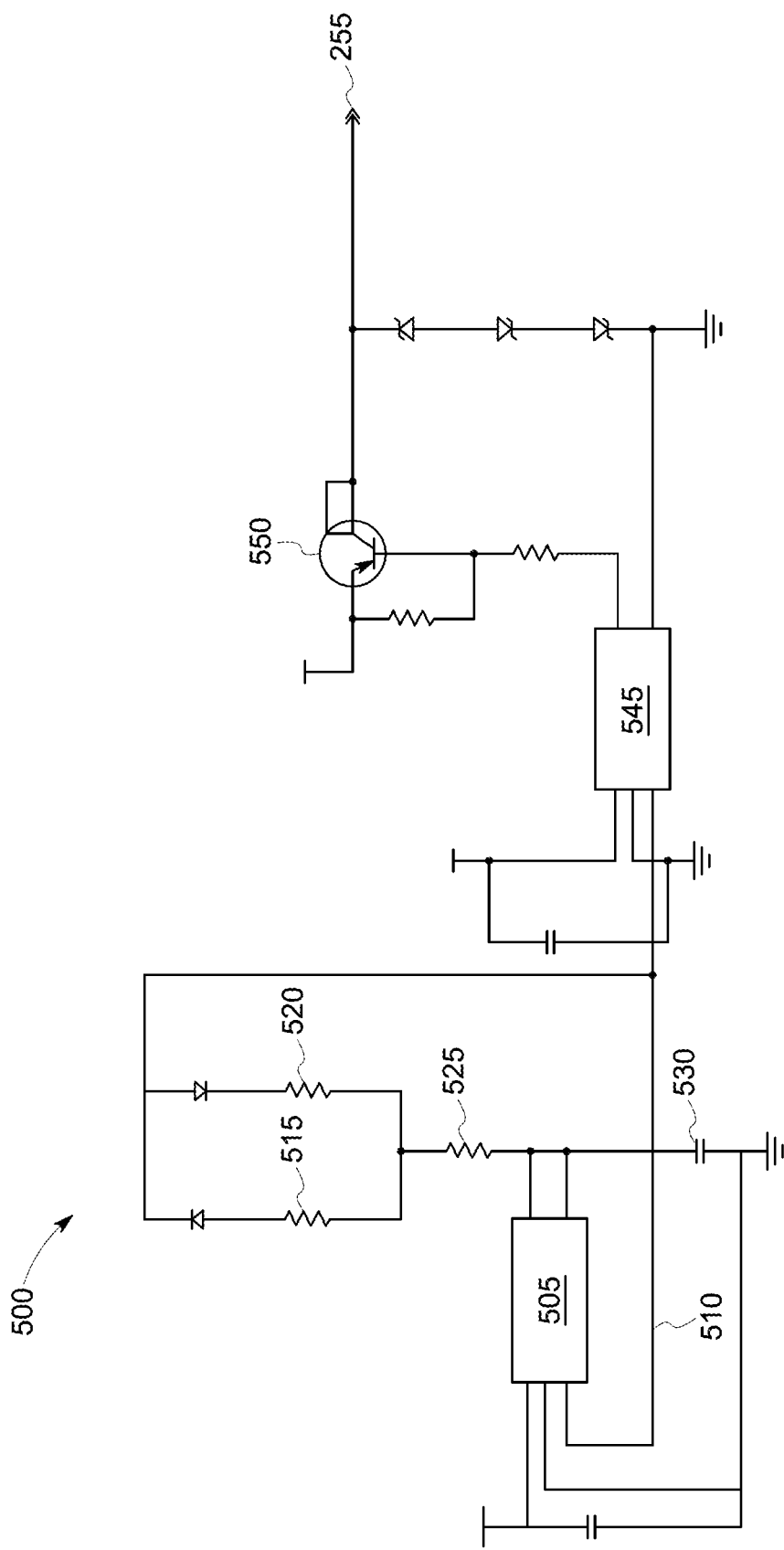
FIG. 5 shows an exemplary frequency generator for producing an external power signal.

As shown in FIG. 1, the winding driver signal 255 may be accessible from outside the auxiliary bias supply 100 through communication port 160. FIG. 5 shows an exemplary frequency generator 500 for producing the winding driver signal 255. The frequency generator 500 may include a timer 505 having an output 510 for producing the winding driver signal 255 at a frequency and duty cycle determined by resistors 515, 520, 525, and capacitor 530. The frequency generator 500 may also include one or more power drivers 545, 550 for providing the winding driver signal 255 at a specified voltage and current. In some embodiments, one or more of the frequency, duty cycle, voltage and current may be determined by the characteristics of one or more of the transformer 115, windings 130, 135 and an electrical load presented by one or more of the primary circuit and the electrically isolated circuit.

Figure 6:
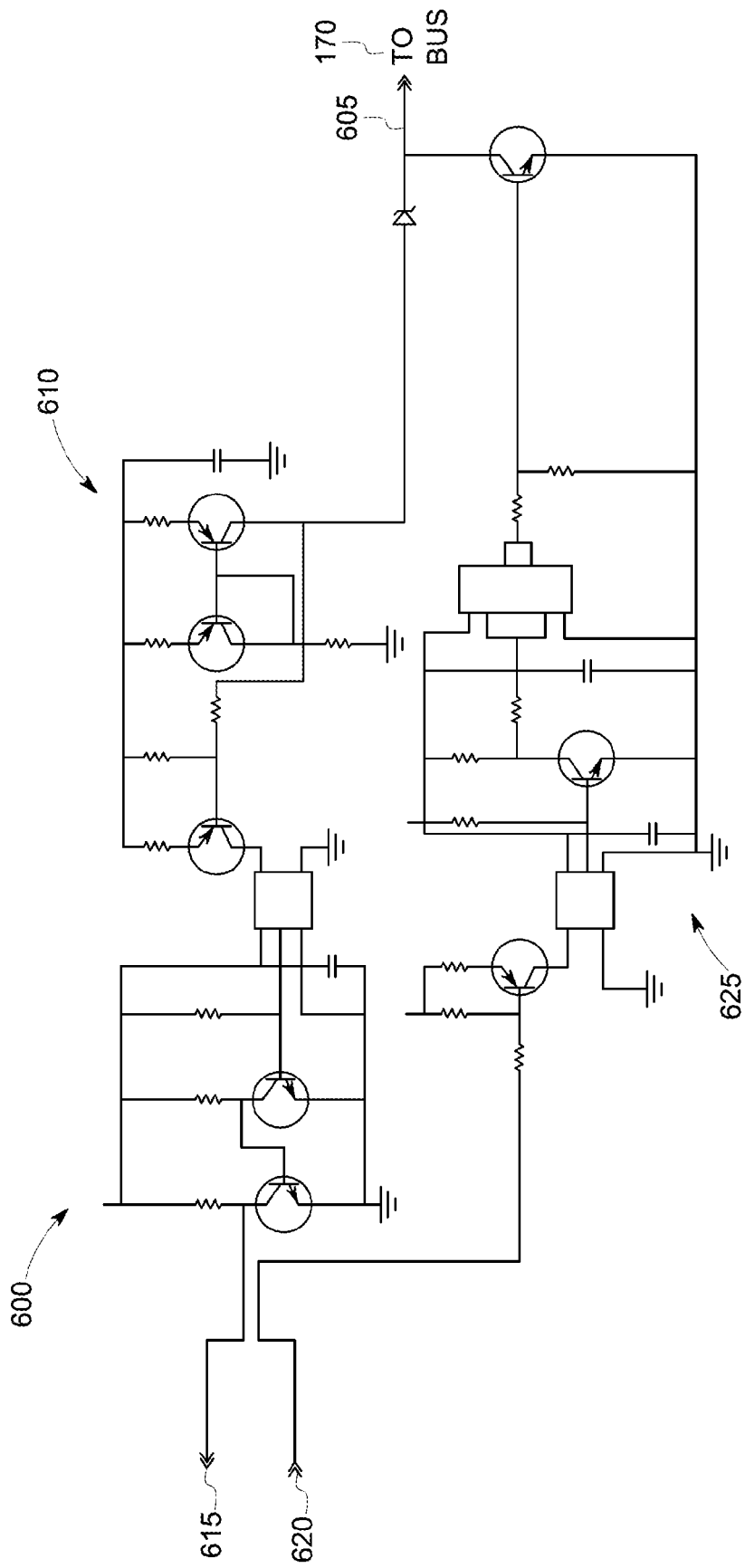
FIG. 6 shows an exemplary external communication circuit for exchanging data with a microcontroller of the disclosed embodiments.

When power is provided to the microcontroller 155 according to the disclosed embodiments, communication may be established with the microcontroller 155 in order to program the microcontroller 155, store data in memory 315, or read data from memory 315. FIG. 6 shows an exemplary external communication circuit 600 for exchanging data with the microcontroller 155. A conductor 605 of the external communication circuit 600 may be connected to the bus signal 170 of the communication port 160. Data received from the microcontroller 155 may be extracted from the bus signal 170 using circuit 610 and may be provided by signal 615. Data to be transmitted to the microcontroller 155 may be provided as signal 620 and may be conditioned for injection onto the bus signal 170 by circuit 625. The data to be transmitted may include commands to be executed by the microprocessor 310 and data to be stored in memory 315, while the data received from the microcontroller may include test results, performance statistics, or data retrieved from memory 315.

It should be understood that frequency generator 500 and external communication circuit 600 may be incorporated as part of a test fixture for configuring, characterizing, or testing the auxiliary bias supply 100.

In some embodiments, the frequency generator 500 may be incorporated as part of the isolated circuit 110 of the auxiliary bias supply 100.

Figure 7:
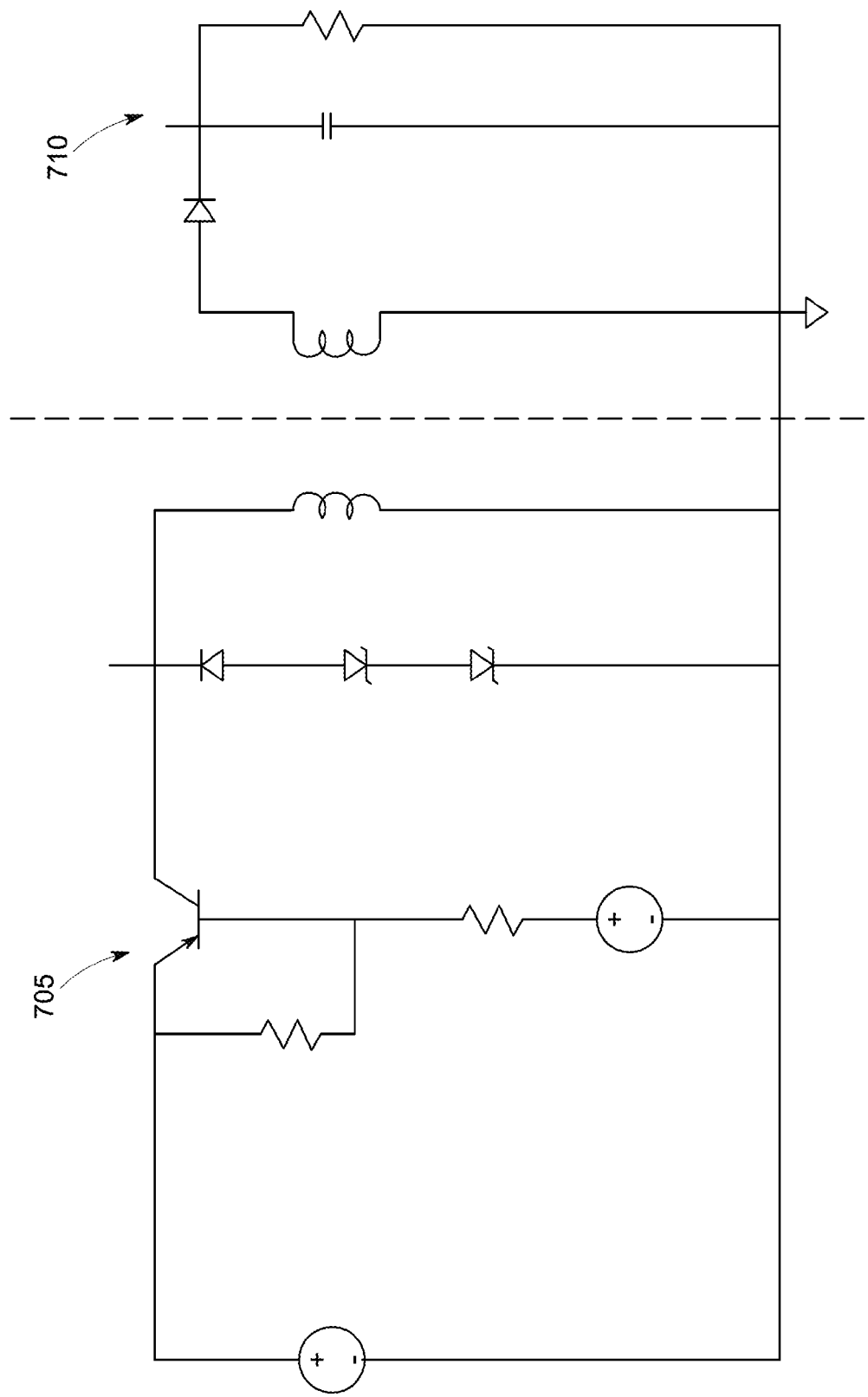
FIG. 7 shows an equivalent circuit used for simulating the performance of the disclosed embodiments.

FIG. 7 shows an equivalent circuit used for simulating the performance of the disclosed embodiments where simulated circuit 705 represents the frequency generator 500 driving winding 130 and simulated circuit 710 represents a load provided by winding 135 and the circuitry of the primary circuit.

Figure 8:
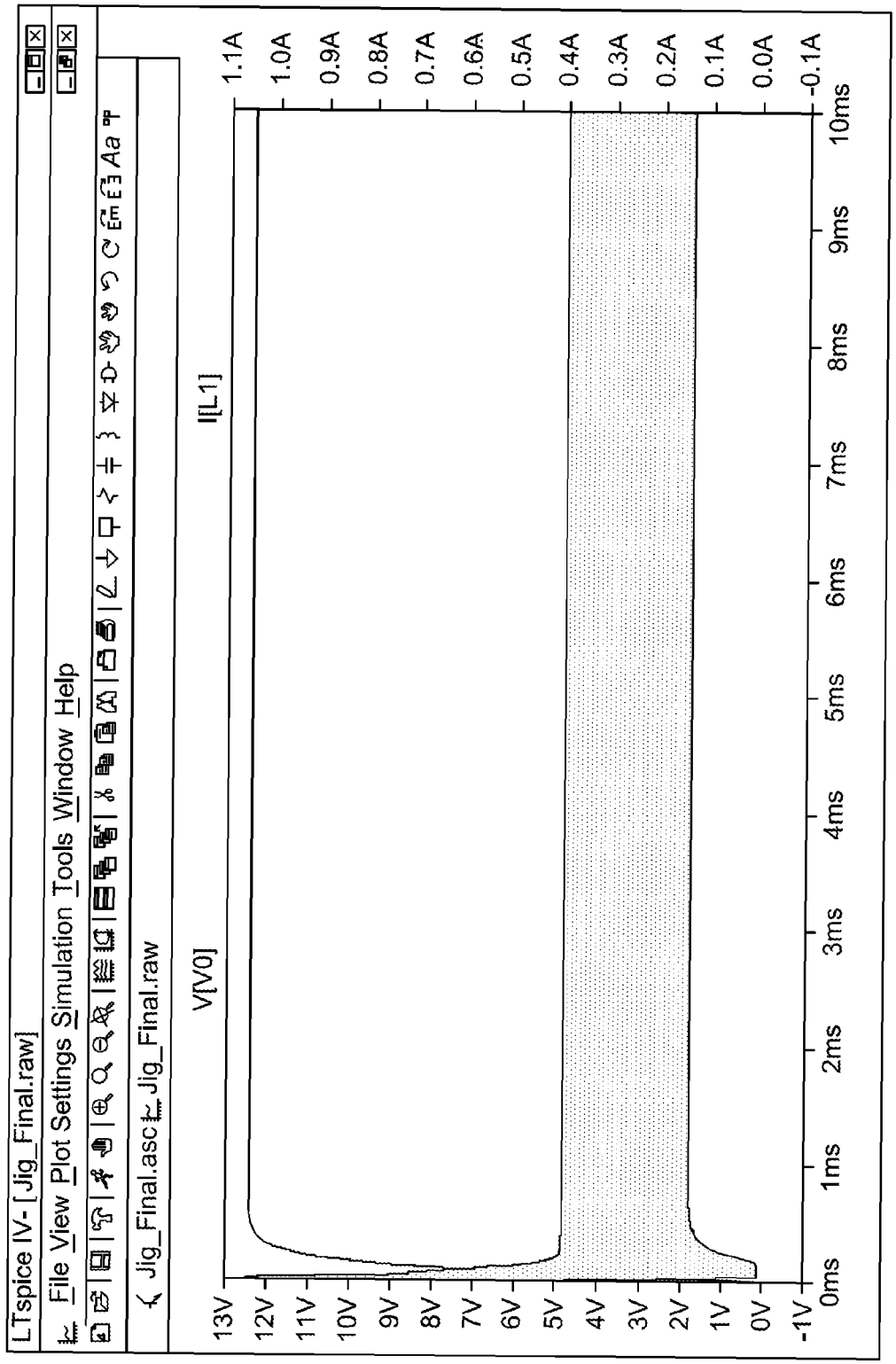
FIG. 8 shows the results produced by the simulated circuit.

FIG. 8 shows the results produced by the simulated circuit when sweeping winding driver signal 255 is over a range of periods or frequencies.

Some of the technical and commercial advantages associated with the features of the disclosed embodiments include, but are not limited to being able to program the auxiliary bias supply 100 without connecting the AC line, as well as safer LED driver circuit current programming at the factory. In addition, the solutions presented herein provide communication with the LED driver circuit without having to connect the AC line. This is useful to retrieve data that was logged within a memory of the microcontroller or to store data in the memory. In addition, the solutions of the present disclosure make it easier for customers, contractors, installers, and others to upload parameters or download firmware updates to the LED driver circuit during installation or servicing. The disclosed embodiments operate to pass power to LED driver circuit components by adding low cost components to the LED driver circuit. Other benefits and advantages over known systems and methods is that the disclosed embodiments do not require additional rectifying circuitry or antenna and rectifying circuitry.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. An LED driver circuit comprising:
    a primary circuit and an electrically isolated circuit that is electrically isolated from the primary circuit;
    a transformer having a primary winding configured to receive power from an alternating current source and to generate power in a first secondary winding configured to provide power to the electrically isolated circuit, and to generate power in a second secondary winding configured to provide power to the primary circuit; and
    a conductor connected to an end of the first secondary winding and configured to connect a winding driver signal to the first secondary winding to generate power in the second secondary winding.

2. The LED driver circuit of claim 1, wherein the winding driver signal is generated by a frequency generator.

3. The LED driver circuit of claim 2, wherein the frequency generator includes a timer configured to produce the winding driver signal at a predetermined frequency and duty cycle.

4. The LED driver circuit of claim 3, wherein the predetermined frequency and duty cycle are determined by characteristics of one or more of the transformer, first and second secondary windings, an electrical load presented by the primary circuit, and an electrical load presented by the electrically isolated circuit.

5. The LED driver circuit of claim 2, wherein the frequency generator includes one or more power drivers for providing the winding driver signal at a specified voltage and current.

6. The LED driver circuit of claim 5, wherein the specified voltage and current are determined by characteristics of one or more of the transformer, first and second secondary windings, an electrical load presented by the primary circuit, and an electrical load presented by the electrically isolated circuit.

7. The LED driver circuit of claim 2, wherein the frequency generator is part of the LED driver circuit.

8. The LED driver circuit of claim 2, wherein the frequency generator is part of a test apparatus configured to be coupled to the LED driver circuit.

9. The LED driver circuit of claim 1, further comprising a communication port configured for exchanging data with a microcontroller of the primary circuit.

10. The LED driver circuit of claim 9, wherein the data includes data read from a memory of the microcontroller.

11. The LED driver circuit of claim 9, wherein the data includes data to be stored in a memory of the microcontroller.

12. The LED driver circuit of claim 9, wherein the data includes commands to be executed by the microcontroller.

13. A method of providing power to an LED driver circuit comprising:
applying a winding driver signal to a first secondary winding of a transformer to generate power in a second secondary winding of the transformer, the transformer having a primary winding configured to receive power from an alternating current source and to generate power in the first and secondary windings;
using power generated in the second secondary winding to provide power to a primary circuit of the LED driver circuit; and
using power generated in the first secondary winding by applying the winding driver signal to the first secondary winding to power an electrically isolated circuit that is electrically isolated from the primary circuit.

14. The method of claim 13, further comprising using a frequency generator to generate the winding driver signal.

15. The method of claim 14, wherein the frequency generator includes one or more of a timer configured to produce the winding driver signal at a predetermined frequency and duty cycle, and one or more power drivers for providing the winding driver signal at a specified voltage and current.

16. The method of claim 15, comprising determining the predetermined frequency and duty cycle from characteristics of one or more of the transformer, first and second secondary windings, an electrical load presented by the primary circuit, and an electrical load presented by the electrically isolated circuit.

17. The method of claim 15, comprising determining the specified voltage and current from characteristics of one or more of the transformer, first and second secondary windings, an electrical load presented by the primary circuit, and an electrical load presented by the electrically isolated circuit.

18. The method of claim 13, further comprising exchanging data with a microcontroller of the primary circuit using a communication port of the LED driver circuit.

19. The method of claim 18, wherein exchanging data with the microcontroller includes reading data from a memory of the microcontroller.

20. The method of claim 18, wherein exchanging data with the microcontroller includes storing data in a memory of the microcontroller.

* * * * *